US008032920B2

(12) United States Patent
Maes

(10) Patent No.: US 8,032,920 B2
(45) Date of Patent: Oct. 4, 2011

(54) POLICIES AS WORKFLOWS

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1056 days.

(21) Appl. No.: 11/024,160

(22) Filed: Dec. 27, 2004

(65) Prior Publication Data

US 2006/0143686 A1 Jun. 29, 2006

(51) Int. Cl.
*G06F 17/00* (2006.01)
*H04L 29/06* (2006.01)

(52) U.S. Cl. .......................................................... 726/1

(58) Field of Classification Search ....................... 726/1
See application file for complete search history.

(56) References Cited

U.S. PATENT DOCUMENTS

| | | | | |
|---|---|---|---|---|
| 5,414,812 | A | 5/1995 | Filip et al. | |
| 5,699,513 | A * | 12/1997 | Feigen et al. | 726/11 |
| 5,786,770 | A | 7/1998 | Thompson | |
| 5,850,517 | A | 12/1998 | Verkler et al. | |
| 5,867,665 | A | 2/1999 | Butman et al. | |
| 6,115,690 | A | 9/2000 | Wong | |
| 6,119,104 | A | 9/2000 | Brumbelow | |
| 6,128,645 | A | 10/2000 | Butman et al. | |
| 6,157,941 | A | 12/2000 | Verkler et al. | |
| 6,163,800 | A | 12/2000 | Ejiri | |
| 6,230,271 | B1 | 5/2001 | Wadlow et al. | |
| 6,272,556 | B1 | 8/2001 | Gish | |
| 6,336,138 | B1 | 1/2002 | Caswell et al. | |
| 6,374,305 | B1 | 4/2002 | Gupta et al. | |
| 6,466,984 | B1 * | 10/2002 | Naveh et al. | 709/228 |
| 6,578,159 | B1 | 6/2003 | Kitagawa et al. | |
| 6,611,812 | B2 | 8/2003 | Hurtado et al. | |
| 6,748,570 | B1 | 6/2004 | Bahrs et al. | |
| 6,792,605 | B1 | 9/2004 | Roberts et al. | |
| 6,868,413 | B1 | 3/2005 | Grindrod et al. | |
| 6,978,348 | B2 | 12/2005 | Belknap et al. | |
| 6,985,939 | B2 | 1/2006 | Fletcher et al. | |
| 7,003,578 | B2 | 2/2006 | Kanada et al. | |
| 7,042,988 | B2 | 5/2006 | Juitt et al. | |
| 7,111,060 | B2 | 9/2006 | Araujo et al. | |
| 7,114,146 | B2 | 9/2006 | Zhang et al. | |
| 7,114,148 | B2 | 9/2006 | Irving et al. | |
| 7,143,092 | B1 | 11/2006 | Gregorat | |
| 7,146,616 | B2 | 12/2006 | Dorner et al. | |
| 7,185,342 | B1 | 2/2007 | Carrer et al. | |
| 7,194,482 | B2 | 3/2007 | Larkin et al. | |
| 7,222,334 | B2 | 5/2007 | Casati et al. | |

(Continued)

OTHER PUBLICATIONS

Maes, Stephanie, Multi-modal Web IBM Position W3C/WAP Workshop, IBM Research Human Language Technologies, downloaded http://www.w3.org on May 26, 2003, 9 pages.

(Continued)

*Primary Examiner* — Benjamin Lanier
*Assistant Examiner* — Cordelia Zecher
(74) *Attorney, Agent, or Firm* — Kilpatrick Townsend & Stockton LLP

(57) ABSTRACT

Methods, systems, and machine-readable mediums are disclosed for policy enforcement. In one embodiment, the method comprises receiving a communication and executing a workflow to apply one or more policies to the communication. The workflow includes a logical combination of one or more conditions to be satisfied and one or more actions to be executed to enforce the one or more policies on the communication.

19 Claims, 6 Drawing Sheets

U.S. PATENT DOCUMENTS

| | | | | |
|---|---|---|---|---|
| 7,272,625 | B1 | 9/2007 | Hannel et al. | |
| 7,340,508 | B1 | 3/2008 | Kasi et al. | |
| 7,409,707 | B2 | 8/2008 | Swander et al. | |
| 7,411,943 | B2 | 8/2008 | Kittredge et al. | |
| 7,433,838 | B2 | 10/2008 | Welsh et al. | |
| 7,447,793 | B2 | 11/2008 | Morioka | |
| 7,454,399 | B2 | 11/2008 | Matichuk | |
| 7,461,062 | B2 | 12/2008 | Stewart et al. | |
| 7,472,349 | B1 | 12/2008 | Srivastava et al. | |
| 7,519,076 | B2 | 4/2009 | Janssen et al. | |
| 7,580,994 | B1 | 8/2009 | Fiszman et al. | |
| 7,617,521 | B2 | 11/2009 | Maes | |
| 7,630,953 | B2 | 12/2009 | Stauber et al. | |
| 7,716,310 | B2 | 5/2010 | Foti | |
| 7,752,634 | B1 | 7/2010 | Saxena et al. | |
| 7,853,647 | B2 | 12/2010 | Maes | |
| 7,860,490 | B2 | 12/2010 | Maes | |
| 7,873,716 | B2 | 1/2011 | Maes | |
| 2002/0002684 | A1* | 1/2002 | Fox et al. | 713/200 |
| 2002/0087674 | A1 | 7/2002 | Guilford et al. | |
| 2002/0099738 | A1 | 7/2002 | Grant | |
| 2002/0101879 | A1 | 8/2002 | Bouret | |
| 2002/0111848 | A1 | 8/2002 | White | |
| 2002/0143819 | A1 | 10/2002 | Han et al. | |
| 2002/0144119 | A1 | 10/2002 | Benatar | |
| 2002/0178122 | A1 | 11/2002 | Maes | |
| 2002/0184373 | A1 | 12/2002 | Maes | |
| 2002/0191774 | A1 | 12/2002 | Creamer et al. | |
| 2002/0194388 | A1 | 12/2002 | Boloker et al. | |
| 2002/0198719 | A1 | 12/2002 | Gergic et al. | |
| 2002/0198991 | A1 | 12/2002 | Gopalakrishnan et al. | |
| 2003/0003953 | A1 | 1/2003 | Houplain | |
| 2003/0023953 | A1 | 1/2003 | Lucassen et al. | |
| 2003/0046316 | A1 | 3/2003 | Gergic et al. | |
| 2003/0061268 | A1 | 3/2003 | Moerdijk et al. | |
| 2003/0115203 | A1 | 6/2003 | Brown et al. | |
| 2003/0115260 | A1 | 6/2003 | Edge | |
| 2003/0131076 | A1 | 7/2003 | Nelson et al. | |
| 2003/0191769 | A1 | 10/2003 | Crisan et al. | |
| 2003/0208539 | A1 | 11/2003 | Gildenblat et al. | |
| 2003/0217044 | A1 | 11/2003 | Zhang et al. | |
| 2003/0229812 | A1 | 12/2003 | Buchholz | |
| 2004/0015547 | A1 | 1/2004 | Griffin et al. | |
| 2004/0015578 | A1 | 1/2004 | Karakashian et al. | |
| 2004/0024720 | A1* | 2/2004 | Fairweather | 706/46 |
| 2004/0064528 | A1* | 4/2004 | Meredith et al. | 709/219 |
| 2004/0068586 | A1 | 4/2004 | Xie et al. | |
| 2004/0110493 | A1 | 6/2004 | Alvarez et al. | |
| 2004/0128546 | A1 | 7/2004 | Blakley et al. | |
| 2004/0139319 | A1 | 7/2004 | Favazza et al. | |
| 2004/0161090 | A1 | 8/2004 | Digate et al. | |
| 2004/0176988 | A1 | 9/2004 | Boughannam | |
| 2004/0221005 | A1 | 11/2004 | Albaugh et al. | |
| 2005/0015340 | A1 | 1/2005 | Maes | |
| 2005/0021670 | A1 | 1/2005 | Maes | |
| 2005/0054287 | A1 | 3/2005 | Kim | |
| 2005/0086197 | A1 | 4/2005 | Boubez et al. | |
| 2005/0086297 | A1* | 4/2005 | Hinks | 709/203 |
| 2005/0091156 | A1 | 4/2005 | Hailwood et al. | |
| 2005/0125696 | A1 | 6/2005 | Afshar et al. | |
| 2005/0132086 | A1 | 6/2005 | Flurry et al. | |
| 2005/0228984 | A1 | 10/2005 | Edery et al. | |
| 2005/0249190 | A1 | 11/2005 | Birch | |
| 2005/0249344 | A1 | 11/2005 | Mueller et al. | |
| 2005/0267979 | A1 | 12/2005 | Bailey | |
| 2006/0014688 | A1 | 1/2006 | Costa et al. | |
| 2006/0041669 | A1 | 2/2006 | Bemmel et al. | |
| 2006/0080117 | A1 | 4/2006 | Carr et al. | |
| 2006/0116912 | A1 | 6/2006 | Maes | |
| 2006/0117109 | A1 | 6/2006 | Maes | |
| 2006/0164902 | A1 | 7/2006 | Fung | |
| 2006/0165060 | A1 | 7/2006 | Dua | |
| 2006/0178898 | A1 | 8/2006 | Habibi | |
| 2006/0190600 | A1 | 8/2006 | Blohm et al. | |
| 2006/0256774 | A1 | 11/2006 | Rigaldies et al. | |
| 2006/0272028 | A1 | 11/2006 | Maes | |
| 2006/0282856 | A1 | 12/2006 | Errico et al. | |
| 2006/0291507 | A1 | 12/2006 | Sarosi et al. | |
| 2007/0005770 | A1 | 1/2007 | Kramer et al. | |
| 2007/0011322 | A1 | 1/2007 | Moiso | |
| 2007/0061397 | A1 | 3/2007 | Gregorat et al. | |
| 2007/0100831 | A1 | 5/2007 | Cox | |
| 2007/0100981 | A1 | 5/2007 | Adamczyk et al. | |
| 2007/0118618 | A1 | 5/2007 | Kisel et al. | |
| 2007/0150480 | A1 | 6/2007 | Hwang et al. | |
| 2007/0150936 | A1 | 6/2007 | Maes | |
| 2007/0203841 | A1 | 8/2007 | Maes | |
| 2007/0204017 | A1 | 8/2007 | Maes | |
| 2007/0233883 | A1 | 10/2007 | De Lutiis et al. | |
| 2007/0239866 | A1 | 10/2007 | Cox et al. | |
| 2007/0271554 | A1 | 11/2007 | Fletcher et al. | |
| 2007/0276907 | A1 | 11/2007 | Maes | |
| 2007/0280226 | A1 | 12/2007 | Sonalkar et al. | |
| 2007/0291859 | A1 | 12/2007 | Maes | |
| 2008/0013533 | A1 | 1/2008 | Bogineni et al. | |
| 2008/0025243 | A1 | 1/2008 | Corneille et al. | |
| 2008/0080479 | A1 | 4/2008 | Maes | |
| 2008/0109853 | A1 | 5/2008 | Einarsson et al. | |
| 2008/0151918 | A1 | 6/2008 | Foti | |
| 2008/0162637 | A1 | 7/2008 | Adamczyk et al. | |
| 2008/0168523 | A1 | 7/2008 | Ansari et al. | |
| 2008/0186845 | A1 | 8/2008 | Maes | |
| 2008/0189401 | A1 | 8/2008 | Maes | |
| 2008/0228919 | A1 | 9/2008 | Doshi et al. | |
| 2008/0232567 | A1 | 9/2008 | Maes | |
| 2008/0235230 | A1 | 9/2008 | Maes | |
| 2008/0235327 | A1 | 9/2008 | Maes et al. | |
| 2008/0235354 | A1 | 9/2008 | Maes | |
| 2008/0235380 | A1 | 9/2008 | Maes | |
| 2008/0275883 | A1 | 11/2008 | Ashraf et al. | |
| 2008/0288966 | A1 | 11/2008 | Maes | |
| 2008/0301135 | A1 | 12/2008 | Alves et al. | |
| 2008/0307108 | A1 | 12/2008 | Yan et al. | |
| 2009/0006360 | A1 | 1/2009 | Liao et al. | |
| 2009/0015433 | A1 | 1/2009 | James et al. | |
| 2009/0034426 | A1 | 2/2009 | Luft et al. | |
| 2009/0061404 | A1 | 3/2009 | Toly | |
| 2009/0112875 | A1 | 4/2009 | Maes | |
| 2009/0119303 | A1 | 5/2009 | Rio et al. | |
| 2009/0125595 | A1 | 5/2009 | Maes | |
| 2009/0132717 | A1 | 5/2009 | Maes | |
| 2009/0187919 | A1 | 7/2009 | Maes | |
| 2009/0193057 | A1 | 7/2009 | Maes | |
| 2009/0193433 | A1 | 7/2009 | Maes | |
| 2009/0201917 | A1 | 8/2009 | Maes et al. | |
| 2009/0228584 | A1 | 9/2009 | Maes et al. | |
| 2009/0328051 | A1 | 12/2009 | Maes | |
| 2010/0049640 | A1 | 2/2010 | Maes | |
| 2010/0049826 | A1 | 2/2010 | Maes | |
| 2010/0058436 | A1 | 3/2010 | Maes | |
| 2010/0077082 | A1 | 3/2010 | Hession et al. | |

OTHER PUBLICATIONS

Maes, Stephanie, Multi-modal Browser Architecture, Overview on the support of multi-modal browsers in 3GPP, IBM Research Mobile Speech Solutions and Conversational Multi-modal Computing, downloaded http://www.w3.org on May 26, 2003, 25 pages.

Sundsted, Todd E., With Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.

Single Sign on Deployment Guide, Introduction to Single-Sign-On, Netscape 6 Documentation Training Manual hhtp://developer.netscape.com/docs/manuals/security/SSO/sso.htm on May 26, 2003, 5 pages.

Liberty Architecture Overview, Liberty Alliance Project Version 1.1, Piscataway New Jersey, Jan. 15, 2003, 44 pages.

U.S. Appl. No. 11/070,317, filed Mar. 1, 2005, Maes.

Parlay APIs 4.0, Parlay X Web Services White Paper, The Parley Group: Parlay X Working Group, Dec. 16, 2002, 12 pages.

*Policy-Based Management* Tom Sheldon's Linktionary, downloaded http://www.lintionary.com/p/policy.html on Aug. 2, 2004, 4 pages.

Andrews, Tony et al.; Business Process Execution Language for Web Services, Version 1.1.; BEA Systems, International Business Machines Corporation, Microsoft Corporation, SAP AG, Siebel Systems, May 5, 2003, 31 pages.

Seely, Scott, "XML and Web Services Security: Understanding WS-Security", Microsoft Corporation, 2002.
Simpson et al, Java Product Review—Oracle EDA Suite, Dec. 4, 2006, Open Source Magazine, pp. 1-10.
Thomas Manes, Anne, "Registering a Web Service in UDDI", 2003.
U.S. Appl. No. 11/848,347, filed Aug. 31, 2007, Advisory Action mailed Jul. 27, 2010, 3 pages.
U.S. Appl. No. 11/848,347, filed Aug. 31, 2007, Final Office Action mailed May 10, 2010, 15 pages.
U.S. Appl. No. 11/848,347, filed Aug. 31, 2007, Office Action mailed Oct. 29, 2009, 12 pages.
U.S. Appl. No. 11/877,129, filed Oct. 23, 2007, Advisory Action mailed Jun. 3, 2010, 2 pages.
U.S. Appl. No. 11/877,129, filed Oct. 23, 2007, Final Office Action mailed Mar. 29, 2010, 17 pages.
U.S. Appl. No. 11/877,129, filed Oct. 23, 2007, Notice of Allowance mailed Aug. 5, 2010, 6 pages.
U.S. Appl. No. 11/877,129, filed Oct. 23, 2007, Office Action mailed Sep. 28, 2009, 15 pages.
U.S. Appl. No. 11/926,738, filed Oct. 29, 2007, Final Office Action mailed Jun. 29, 2010, 12 pages.
U.S. Appl. No. 11/926,738, filed Oct. 29, 2007, Office Action mailed Feb. 24, 2010, 12 pages.
U.S. Appl. No. 11/943,101, filed Nov. 20, 2007, Advisory Action mailed Apr. 16, 2010, 3 pages.
U.S. Appl. No. 11/943,101, filed Nov. 20, 2007, Final Office Action mailed Feb. 2, 2010, 9 pages.
U.S. Appl. No. 11/943,101, filed Nov. 20, 2007, Office Action mailed Jul. 8, 2009, 9 pages.
U.S. Appl. No. 11/951,500, filed Dec. 6, 2007, Advisory Action mailed Jun. 24, 2010, 2 pages.
U.S. Appl. No. 11/951,500, filed Dec. 6, 2007, Final Office Action mailed Mar. 30, 2010, 26 pages.
U.S. Appl. No. 11/951,500, filed Dec. 6, 2007, Office Action mailed Sep. 22, 2009, 24 pages.
U.S. Appl. No. 12/019,299, filed Jan. 24, 2008, Office Action mailed Mar. 31, 2010, 13 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 10/855,999, filed May 28, 2004, Office Action dated Jun. 24, 2010, 20 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 11/130,636, filed May 16, 2005, Notice of Allowance mailed Aug. 18, 2010, 4 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
U.S. Appl. No. 10/856,588, filed May 28, 2004, Office Action dated Apr. 11, 2008, 16 pages.
U.S. Appl. No. 10/856,588, filed May 28, 2004, Final Office Action dated Oct. 15, 2008, 11 pages.
U.S. Appl. No. 10/856,588, filed May 28, 2004, Office Action dated Mar. 16, 2009, 10 pages.
U.S. Appl. No. 10/856,588, filed May 28, 2004, Final Office Action dated Oct. 20, 2009, 17 pages.
U.S. Appl. No. 10/856,588, filed May 28, 2004, Advisory Action dated Jan. 5, 2010, 3 pages.
U.S. Appl. No. 11/123,468, filed May 5, 2005, Office Action dated Apr. 10, 2009, 17 pages.
U.S. Appl. No. 11/123,468, filed May 5, 2005, Final Office Action dated Nov. 24, 2009, 19 pages.
U.S. Appl. No. 11/123,468, filed May 5, 2005, Advisory Action dated Feb. 17, 2010, 3 pages.
U.S. Appl. No. 11/123,468, filed May 5, 2005, Office Action dated Apr. 14, 2010, 16 pages.
U.S. Appl. No. 11/123,471, filed May 5, 2005, Office Action dated Jan. 23, 2009, 8 pages.
U.S. Appl. No. 11/123,471, filed May 5, 2005, Notice of Allowance dated Jun. 29, 2009, 6 pages.
Burger, E. et al., "Deploying CCXML for Application-Layer Call Control," Aug. 2006, 11 pages.
Kim et al., "Implementation of Third Party Based Call Control using Parlay Network API in SIP Environment," ICOIN 2003, LNCS 2662, 2003, pp. 416-425.
Maretzke, Michael, "JAIN SLEE Technology Overview", <http://www.maretzke.de/pub/lectures/jslee_overview_2005/JSLEE_Overview_2005.pdf>, Apr. 12, 2005, 26 pages.
O'Doherty, Phelim, "JSLEE—SIP Servlet", <http://java.sun.com/products/jain/JSLEE-SIPServlet.pdf, 2003, 13 pages.
Romellini, C. et al., "CCXML: The Power of Standardization," Loquendo, Sep. 27, 2005.
The Parlay Group, "Specifications", <http://web.archive.org/web/20050114014707/www.parlay.org/specs/index.asp>, Jan. 14, 2005, 2 pages.
U.S. Appl. No. 11/848,347, filed Aug. 31, 2007, Office Action mailed Sep. 30, 2010, 19 pages.
U.S. Appl. No. 11/926,738, filed Oct. 29, 2007, Advisory Action mailed Sep. 3, 2010, 2 pages.
U.S. Appl. No. 11/926,738, filed Oct. 29, 2007, Office Action mailed Nov. 10, 2010, 12 pages.
U.S. Appl. No. 11/943,101, filed Nov. 20, 2007, Office Action mailed Aug. 27, 2010, 11 pages.
U.S. Appl. No. 11/951,500, filed Dec. 6, 2007, Office Action mailed Sep. 1, 2010, 30 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Final Office Action mailed Oct. 6, 2010, 20 pages.
U.S. Appl. No. 12/019,299, filed Jan. 24, 2008, Office Action mailed Jan. 24, 2011, 16 pages.
U.S. Appl. No. 10/855,999, filed May 28, 2004, Final Office Action dated Jan. 5, 2011, 19 pages.
U.S. Appl. No. 10/856,588, filed May 28, 2004, Notice of Allowance dated Sep. 23, 2010, 8 pages.
U.S. Appl. No. 11/070,317, filed Mar. 1, 2005, Final Office Action dated Sep. 27, 2010, 8 pages.
U.S. Appl. No. 11/123,468, filed May 5, 2005, Final Office Action dated Nov. 10, 2010, 18 pages.
U.S. Appl. No. 11/123,468, filed May 5, 2005, Advisory Action dated Jan. 18, 2011, 2 pages.
U.S. Appl. No. 11/939,705, filed Nov. 14, 2007, Office Action mailed Oct. 4, 2010, 21 pages.

U.S. Appl. No. 12/364,642, filed Feb. 3, 2009, Office Action dated Dec. 20, 2010, 18 pages.

U.S. Appl. No. 11/357,653, filed 2/16/200, Office Action dated Jan. 20, 2011, 18 pages.

Wikipedia, "Parlay", <http://web.archive.org/web/20050130172632/en.wikipedia.org/wiki/Parlay>, Jan. 30, 2005, 3 pages.

Wikipedia, "Object-Oriented Programming", <http://web.archive.org/web/20051211141918/http://en.wikipedia.org/wiki/Object-oriented_programming>, Dec. 11, 2005, 10 pages.

Wikipedia, "OSI model", <http://web.archive.org/web/20050907132012/http://en.wikipedia.org/wiki/Osi_model>, Sep. 7, 2005, 8 pages.

* cited by examiner

POLICIES AS WORKFLOWS

BACKGROUND OF THE INVENTION

Policies are used for a variety of purposes. For instances, polices may be used to authorize or authenticate a user, enforce service level agreements, allocate resources, determine which services a subscriber/user is allowed to access, privacy policies, and usage polices. One example of a policy management system is the IETF policy management architecture. The IETF architecture includes a policy management service for administering policies and policy enforcement points that enforce policies based on the policy rules. Other exemplary environments that use policies include web service activities (e.g., choreography of events, security), Web-Services-Policy (WS-Policy), Object Management Architecture (OMA) activities, and Third Generation Partnership Project (3GPP).

A policy based system may implement policies by defining rules. A rule defines a condition that must be satisfied for an action to be executed. For example, a rule may take the form "If conditions, then action." Thus, in the prior art, policies are conditions that must be satisfied at the time the condition is evaluated. In some instances, multiple conditions may need to be simultaneously satisfied.

BRIEF SUMMARY OF THE INVENTION

Methods, systems, and machine-readable mediums are disclosed for enforcing policies. In one embodiment, the method comprises receiving a communication. By way of example, the communication may be a Simple Object Access Protocol (SOAP) message. A workflow is then executed to apply one or more policies to the communication. The workflow includes a logical combination of one or more conditions to be satisfied and one or more actions to be executed to enforce the one or more policies on the communication. In one embodiment, the workflow may be a Business Process Express Language (BPEL) workflow engine.

Executing the workflow may comprise executing a first action to invoke a policy object (e.g., a BPEL policy object) associated with a first one of the policies. The policy object may include a second combination of one or more conditions and one or more actions associated with the first policy. A second action may also be executed to invoke a second policy object associated with a second one of the policies. In some cases, the first action and the second action may at least partially execute in parallel. In another aspect, executing the workflow may comprise evaluating one or more conditions to determine whether to apply a potential policy to the communication.

In some embodiments, receiving the communication may comprise intercepting a communication targeted for a resource. If the one or more policies are validated, the communication may be transmitted to the resource. In some cases, the communication may be modified based on the policy enforcement before it is transmitted. Alternatively, the policy enforcement may be performed on request. The method may then further comprise transmitting a response indicating a result of the policy evaluation.

In a second embodiment, a system that may be used to enforce policies is disclosed. The system includes an interface to receive a communication, a policy, and workflow logic. The workflow logic includes instructions having a logical combination of at least one condition and at least one action to execute to enforce one or more policies on the communication.

BRIEF DESCRIPTION OF THE DRAWINGS

Illustrative embodiments in accordance with the invention are illustrated in the drawings in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
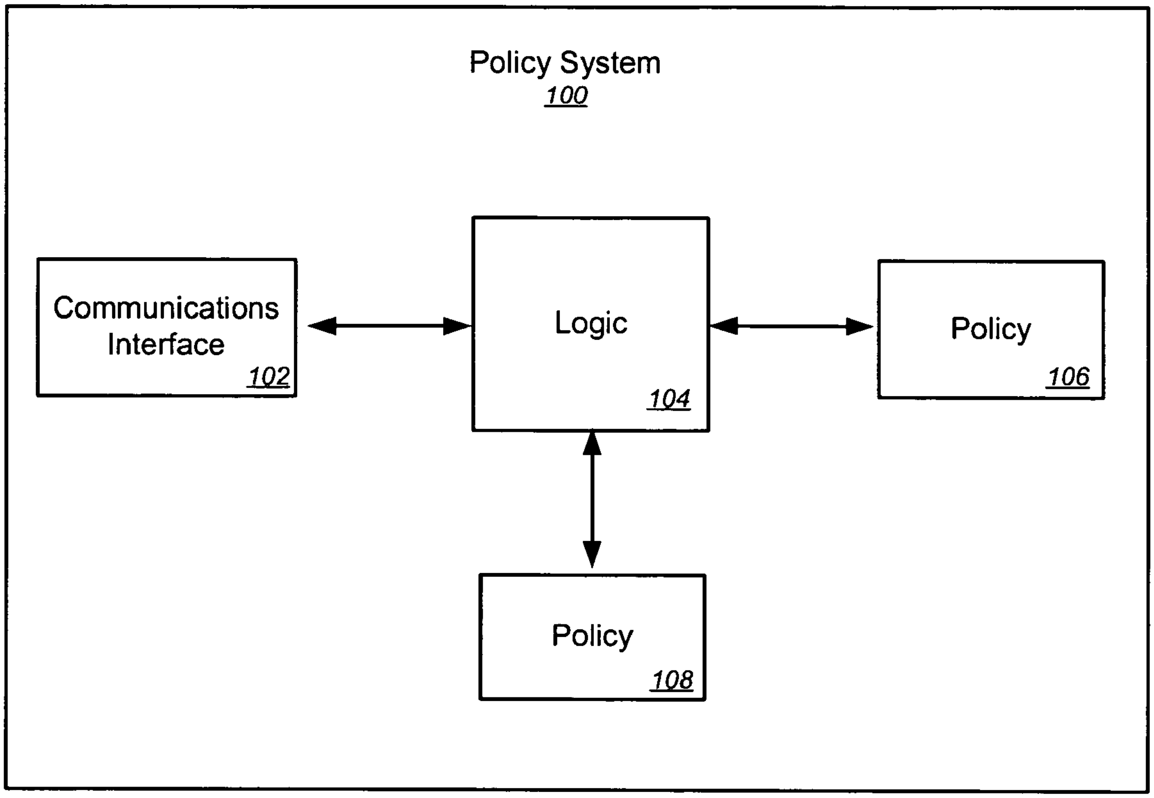
FIG. 1 illustrates an exemplary embodiment of a system that may be used to enforce policies.

FIG. 1 illustrates an exemplary embodiment of a system that may be used to enforce policies. The policy enforcement system 100 may enforce policies by operating as a proxy for one or more resources providing services to requesters (e.g., a web service). Thus, the policy enforcement system 100 may intercept communications to access or use one of the resources. As will be described in further detail below, policy enforcement system 100 may then apply one or more policies to the communication. If the polices are validated, the communication may then be forwarded to the resource for processing. In some instances, policy enforcement system 100 may also enforce policies on responses returned from the resource.

In an alternative embodiment, the policy enforcement system 100 may be specifically invoked (called) by a requester wanting policy enforcement services For instances, before providing services, a resource may send a communication to policy enforcement system 100 to have policies enforced. Other requesters may also invoke policy enforcement system 100.

The policy enforcement system 100 includes a communications interface 102. By way of example, communications interface 102 may be an interface that may be used to send and receive Internet communications, such as web services communications (e.g., SOAP messages). Communications interface 102 may also be used to receive other types of communications to which policies are applied. In embodiments in which policy enforcement system 100 is operating as a proxy, communications interface 102 may intercept communications destined for a resource for which the policy enforcement system 100 is providing proxy service. If the policies are validated, communications interface 102 may then forward the communication to the resource. In some instances, communications interface 102 may also intercept responses from the resource and apply policies to the response communication before forwarding to the user of the resource.

Policy system 100 further includes logic 104 communicatively coupled with communications interface 102. Logic 104 may be one or more software programs, one or more components of a software program (e.g., function or program object), firmware, or other type of machine-executable instructions that may be used to process communications received from communications interface 402. As one example, logic 104 may be a workflow engine using Business Process Execution Language (BPEL).

Logic 104 is also communicatively coupled with one or more policies 106, 108. A policy 106, 108 may be a logical combination of conditions to be satisfied and actions to be executed. Each policy 106, 108 may itself be composed of multiple policies, which further evaluate conditions and/or perform actions. Policies 106, 108 may be programs, program components, or other type of machine-executable instructions. In one embodiment, policies 106, 108 may be program objects, such as a BPEL object or a web service.

As will be described in further detail below, during the processing of a communication received on communications interface 102, logic 104 may use a workflow to determine that one or more policies 106, 108 are to be applied to the communication. For instance, an authorization policy and/or a prioritization policy may be applied to a communication requesting access or use of a resource. The policies to apply to a request or a response may be vary depending on the requester of the resource (or the requester of the policy enforcement services), the target resource, the nature of the request, or the resource initiating a response. Other criteria may also be used by logic 104 to determine which policies to apply. For example, the policies determined by logic 104 to be applicable may at least partially depend on the party affected by a communication (e.g., if a resource is used to send messages to a user, an affected party may be the target user).

Logic 104 may use a workflow (e.g., a BPEL workflow) to perform evaluation of conditions and execute actions to enforce applicable policies 106, 108 and/or to determine which policies 106, 108 to apply to a communication. According to some aspects, logic 104 may evaluate conditions and then request other process or processes (that return results to logic 104) to perform actions. Logic 104 may also or alternatively invoke other processes (e.g., policies 106, 108) that perform evaluation of conditions and perform actions. In some embodiments, logic 104 may itself include policy logic for conditions to be satisfied and actions to be executed to enforce one or more policies.

In embodiments in which policy enforcement system 100 operates as a proxy to a resource, logic 104 may be further determine whether to pass the communication to the resource. If policies are validated, the communication may be passed to the resource for further processing. Logic 104 may modify the communication based on the policy enforcement before passing it to the resource. If the policies are not validated, logic 104 may pass an error message back to the requester. In some instances, logic 104 may first attempt to perform error recovery. In alternative embodiments, in which policy enforcement system 100 is specifically invoked, logic 104 may generate a response providing information on the outcome of the policy enforcement to the requester.

In the configuration described above, different components were described as being communicatively coupled to other components. A communicative coupling is a coupling that allows communication between the components. This coupling may be by means of a bus, cable, network, wireless mechanism, program code call (e.g., modular or procedural call) or other mechanism that allows communication between the components. Thus, it should be appreciated that communications interface 102, logic 104 and policies 106, 108 may reside on the same or different physical devices. Additionally, it should be appreciated that the policy system 100 may contain additional or fewer components that that described in FIG. 1.

Figure 2:
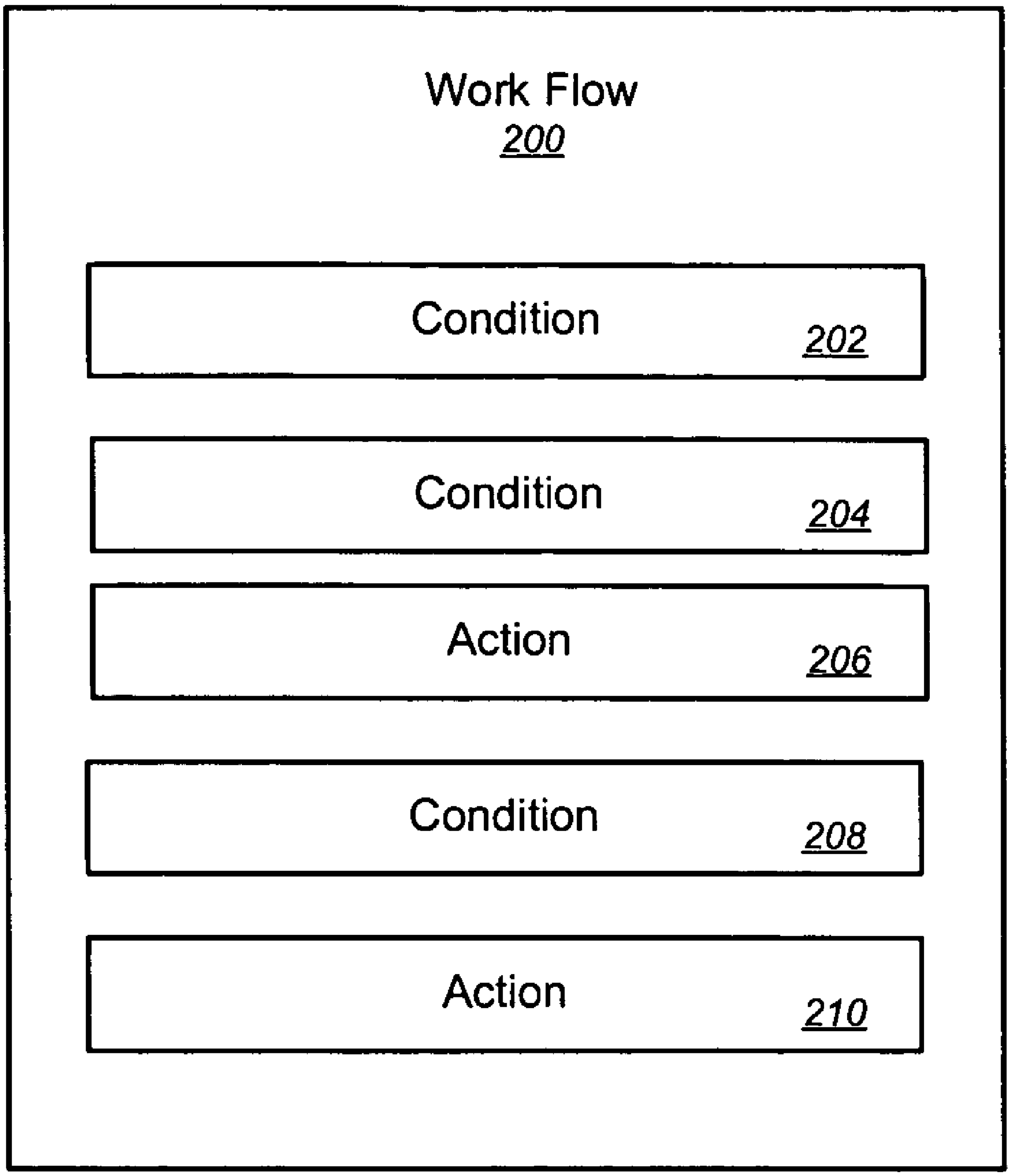
FIG. 2 illustrate an exemplary embodiment of a workflow that may be used to enforce policies.

FIG. 2 illustrates an exemplary embodiment of a workflow 200 that may be used by a policy enforcement system to enforce policies. Workflow 200 includes a plurality of conditions 202, 204, 208 to be satisfied for one or more policies to be validated. Additionally, workflow 200 also includes a plurality of actions 206, 210 to be executed for one or more policies to be validated. In some instances, there may be actions that will only be executed if a condition is not satisfied. One or more conditions 202, 204, 208 may depend on results of past actions 206, 210. As previously described, workflow 200 may delegate execution of actions and/or evaluation of conditions to other processes. Thus, in some embodiments, an action 206, 210 may be an invocation call to a policy that itself may evaluation conditions and perform actions to enforce policies.

The conditions 202, 204, 208 may be logically combined with the actions 206, 210 in a variety of different ways. For instance, workflow 200 may specify that conditions 202, 204 must be satisfied and action 206 must be executed for a policy to be validated, or that condition 208 must be satisfied and action 210 must be executed for the policy to be validated. If neither combination is successful, then the policy may fail validation. Conditions 202, 204, 208 and actions 206, 210 may also be combined differently. Workflow 200 may also include fewer or additional conditions and actions than that shown in FIG. 2.

It should be appreciated that workflow 200 may provide a much more flexible approach to policy implementation than prior solutions. In the prior art, policies are implemented as conditions that must be satisfied when evaluated. Thus, if the policy condition is not satisfied, the policy is not applied. In contrast, by using a workflow 200, policies may be enforced using any logical combination of conditions and actions. By defining a policies as a workflow, policy enforcement may be more dynamic than previous techniques have allowed. For instance, workflow 200 may specify that an action 206 be performed before a condition 208 is evaluated for satisfaction. As another example, workflow 200 may specify optional actions that are to be executed only in the event a condition is or is not satisfied. The conditions may also be based on the result of previous evaluations and/or actions performed.

As previously described, workflow 200 may delegate execution of actions and/or evaluation of conditions to other processes to perform policy enforcement (e.g., a program object, such as a BPEL object or web service). The delegated processes may have both a public and a private interface. The public interface may define parameters that may be passed to the process to be used during the policy evaluation. For instance, an authentication policy may require a security token parameter. The public interface may also include public functions of a policy. The policy may also include a private interface. Thus, in some embodiments, the process may be a "black box" policy, in which the conditions that are evaluated for satisfaction and the actions executed are in a private interface and not know to the workflow logic performing policy enforcement.

Figure 3:
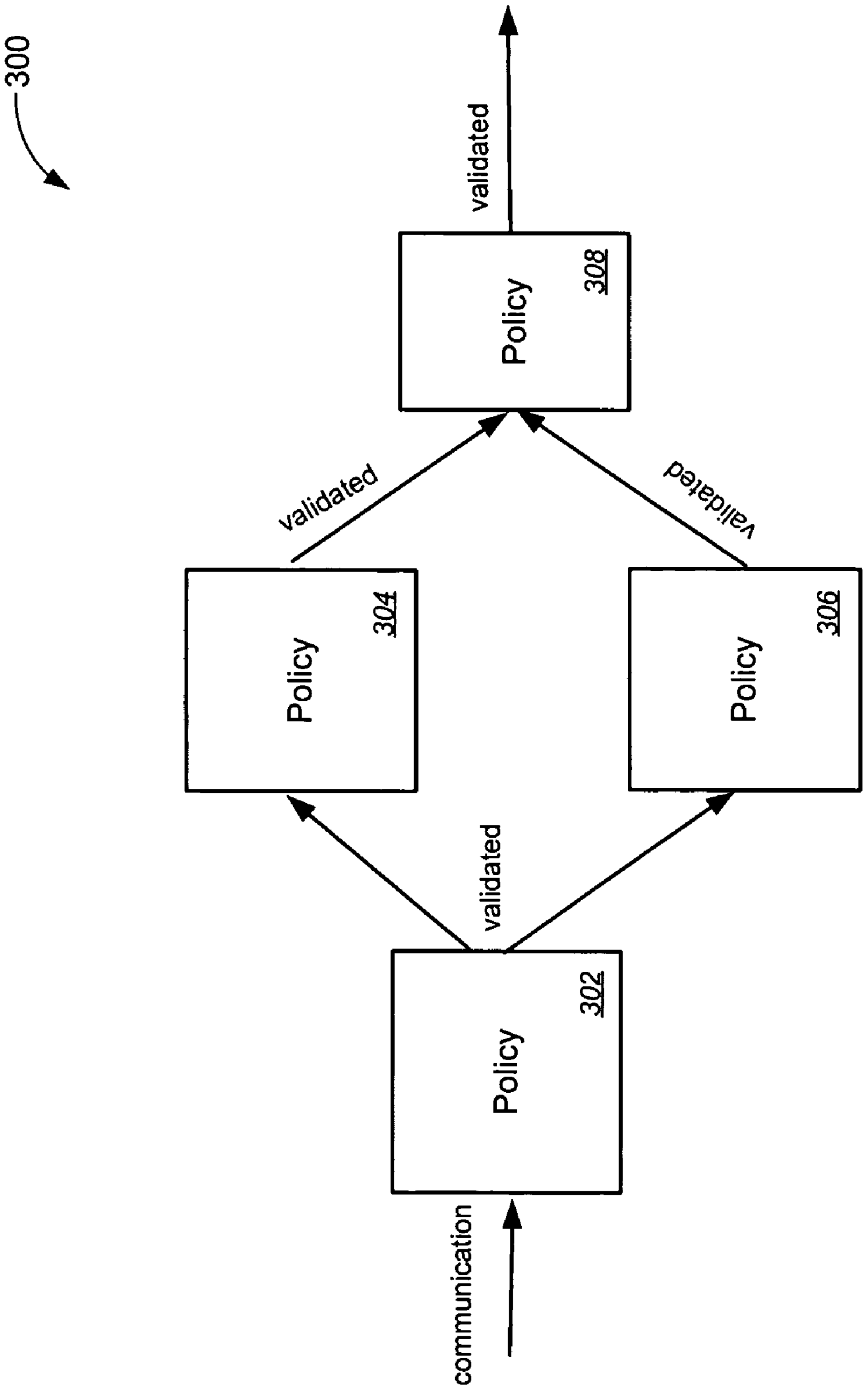
FIG. 3 illustrates an exemplary application of policies to a communication.

FIG. 3 illustrates an exemplary workflow applying policies to a communication. A communication, such as an SOAP message, is received. A workflow engine, script interpreter, or other type of logic in an execution environment, enforces a policy 302 on the communication by invoking the policy. For instance, the communication may be received at a BPEL workflow engine. The policy 302 may be invoked as part of commands in an execution flow.

If the policy 302 executes successfully, it is validated. Additional policies 304, 306, 308 may then be applied to the communication. In some cases, policies 304, 306 may be executed in parallel. By way of example, the policies 304, 306 may be invoked as part of a BPEL flow. After all of the applicable policies have been validated, the workflow engine, or other logic, may proceed with taking actions to process the communication.

In FIG. 3, the policies 302, 304, 306, 308 all executed successfully. In some embodiments, in the event a policy does not execute successfully, error recovery may be applied. For example, a BPEL fault handler may specify actions that occur if a policy 302, 304, 306, 308 does not execute successfully.

Figure 4:
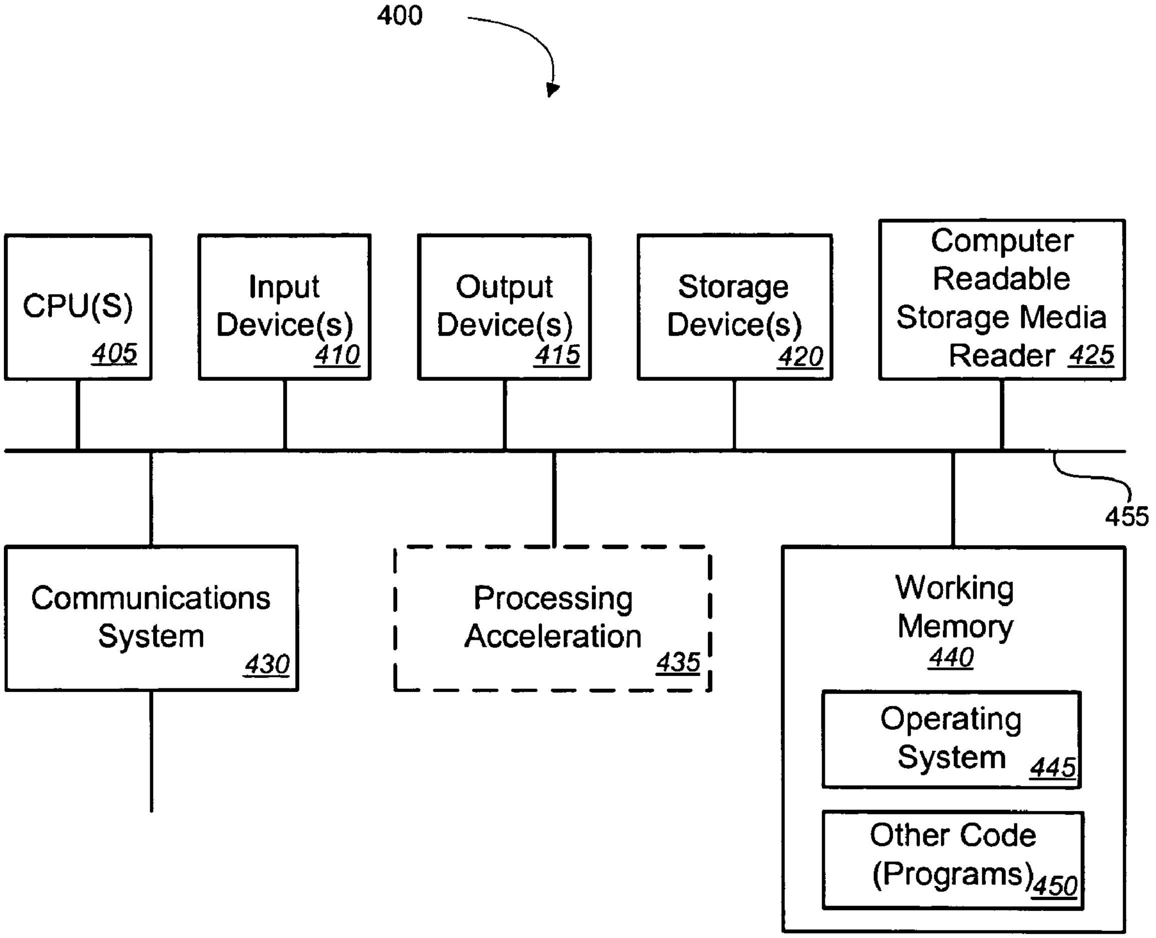
FIG. 4 is a block diagram of an exemplary computer system upon which a policy enforcement system may be implemented.

FIG. 4 illustrates one embodiment of a computer system 400 upon which a policy enforcement system or components of a policy enforcement system may be implemented. The computer system 400 is shown comprising hardware elements that may be electrically coupled via a bus 455. The hardware elements may include one or more central processing units (CPUs) 405; one or more input devices 410 (e.g., a mouse, a keyboard, etc.); and one or more output devices 415 (e.g., a display device, a printer, etc.). The computer system 400 may also include one or more storage device 420. By way of example, storage device(s) 420 may be disk drives, optical storage devices, solid-state storage device such as a random access memory ("RAM") and/or a read-only memory ("ROM"), which can be programmable, flash-updateable and/or the like.

The computer system 400 may additionally include a computer-readable storage media reader 425; a communications system 430 (e.g., a modem, a network card (wireless or wired), an infra-red communication device, etc.); and working memory 440, which may include RAM and ROM devices as described above. In some embodiments, the computer system 400 may also include a processing acceleration unit 435, which can include a DSP, a special-purpose processor and/or the like.

The computer-readable storage media reader 425 can further be connected to a computer-readable storage medium, together (and, optionally, in combination with storage device(s) 420) comprehensively representing remote, local, fixed, and/or removable storage devices plus storage media for temporarily and/or more permanently containing computer-readable information. The communications system 430 may permit data to be exchanged with a network and/or any other computer.

The computer system 400 may also comprise software elements, shown as being currently located within a working memory 440, including an operating system 445 and/or other code 450, such as an application program. The application programs may implement a policy enforcement system, components of a policy enforcement system, and/or the methods of the invention. It should be appreciate that alternate embodiments of a computer system 400 may have numerous variations from that described above. For example, customized hardware might also be used and/or particular elements might be implemented in hardware, software (including portable software, such as applets), or both. Further, connection to other computing devices such as network input/output devices may be employed.

Figure 5:
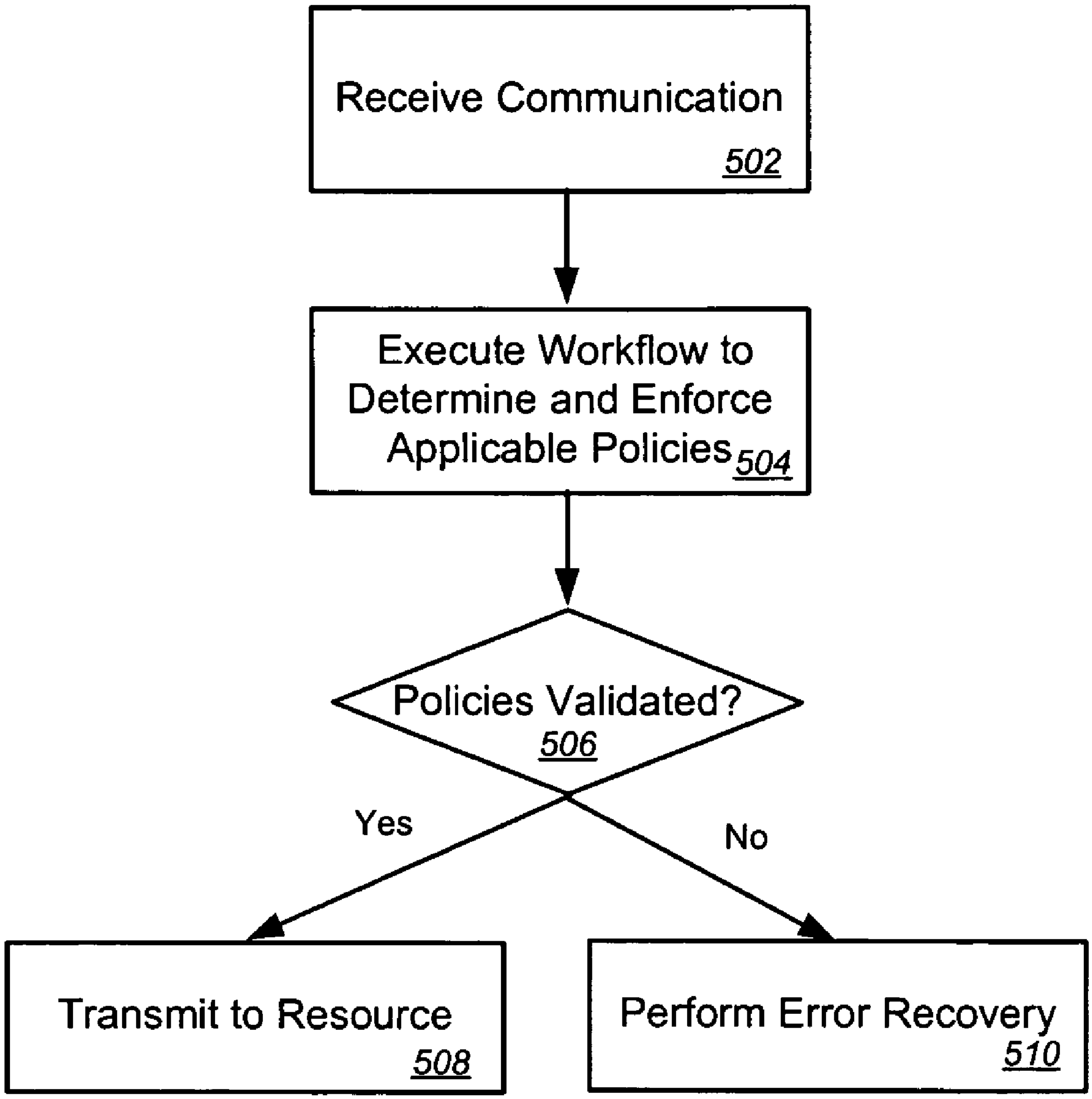
FIG. 5 is a flow diagram of a method for enforcing policies according to one embodiment.

FIG. 5 illustrates an exemplary method that may be used to enforce policies on a communication. The method may begin by receiving 502 a communication, such as a SOAP message. In one embodiment, receiving the communication may comprise intercepting a communication destined for a target resource. Alternatively, the communication may be transmitted as part of a request to perform policy enforcement.

A workflow may then be executed 504 to determine one or more policies to be applied to the communication. By way of example, a determination may be made as to which policies to apply based on one or more conditions, such as the requester identity, the communication type, or the target of the communication. Thus, one or more conditions may be evaluated in the workflow to determine which policies to apply. In some cases, the polices that are applied may depend on the results of a previous action.

Executing 504 the workflow may also comprise enforcing the applicable policies. The policies may be enforced by executing one or more actions. By way of example, an action may be executed to enforce a policy by making a program call (invoking) to a function, object, or other program. For instances, a BPEL policy object may be invoked by executing a statement in the format <invoke policy="policy id">. In some cases, actions to enforce policies may at least partially execute in parallel.

Parameters may also be specified in the invocation call. The invoked process may also invoke other processes to enforce sub-policies.

If the actions associated with a policy or policies executes successfully, the policy or policies may be considered validated 506. The communication may then be transmitted 508 to a target resource. In some instances, policies may also be enforced on return communications from the target resource. Alternatively, a response may be transmitted to a requester requesting the policy enforcement indicating a result of the policy enforcement.

If the policies are not validated 506, error recovery may be performed 510. For instances, program code specified in a fault handler may be executed. Alternately, processing of the communication may terminate and an error may be returned to the initiator of the communication.

Figure 6:
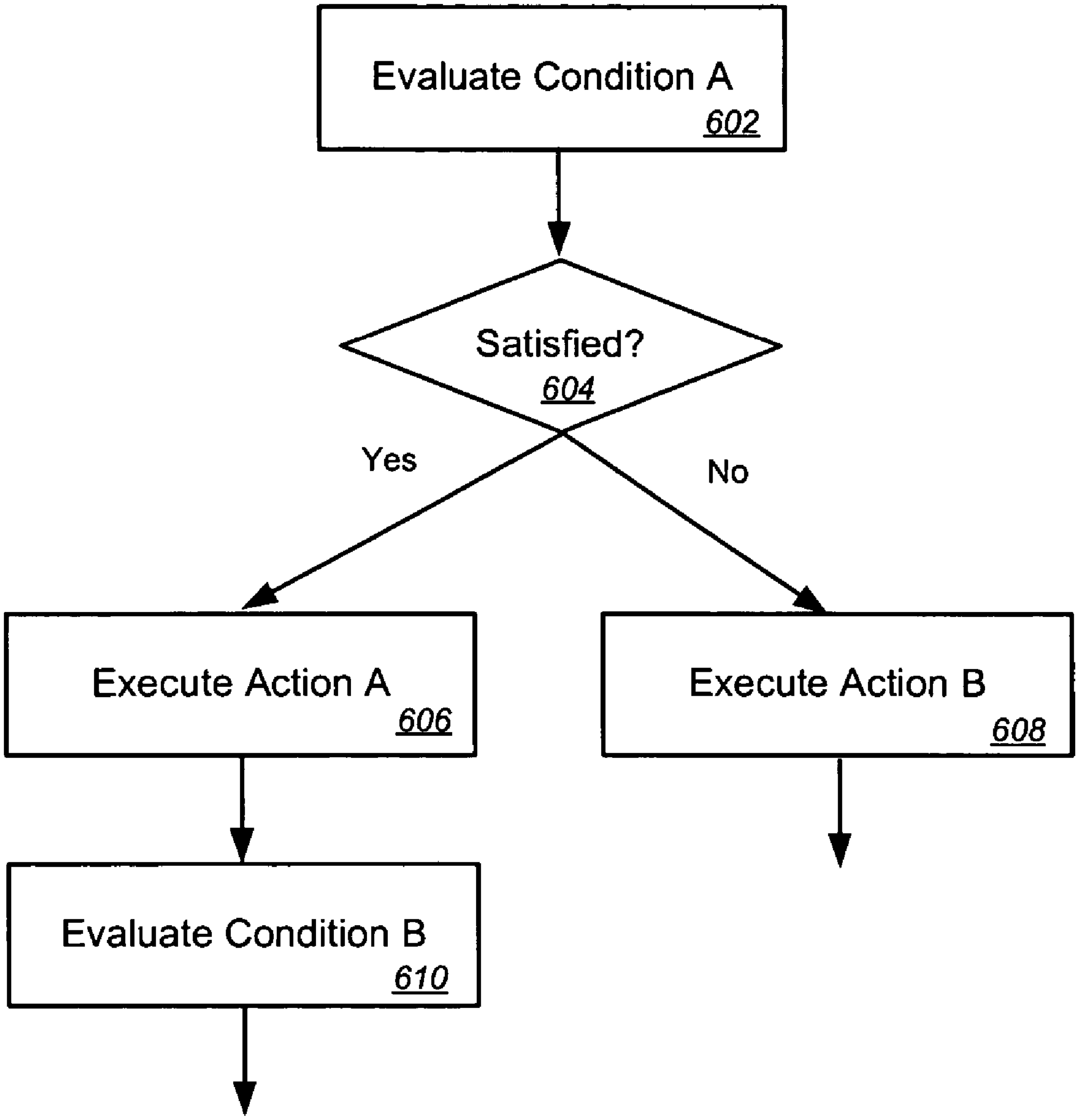
FIG. 6 is a flow diagram illustrating an exemplary workflow.

FIG. 6 illustrates an exemplary workflow that may be used to enforce applicable policies on a communication. The workflow may begin by evaluating 602 a condition to be satisfied to determine which policy to apply to a communication. (condition A). If condition A is satisfied, an action (which may be an invocation to a policy object) is executed 606. After the action has completed, another condition (Condition B) may be evaluated to determine whether to apply another policy. In some cases, the results of the action may have changed the conditions, so that satisfaction of Condition B is different than before execution 606 of the action. Alternatively, condition B may be evaluated while the action is executed. In some cases, a second action (not shown) may be executed so that it executes at least partially in parallel with the first action.

If condition A is not satisfied 604, an alternative action, which may invoke a different policy object, is executed 608. The workflow may also include additional conditions to be evaluated 610 and/or other actions for validation may be executed. In some instances, the workflow may itself include conditions to be satisfied and actions to executed to enforce a policy on a communication. It should be appreciated that FIG. 6 illustrates a simplified example of policy execution and that alternate embodiments may include additional or fewer conditions and actions and may combine the conditions and actions in a manner different than that illustrated.

One example of a policy that may be enforced using a policy enforcement system is an authorization policy. The authorization policy may include conditions to be satisfied and actions to execute to determine whether a requester is authorized to access a resource and which services By way of example, an authorization condition may specify that a certain type of request to a target must be authenticated with a specific level of security and authentication mechanism (e.g., token, digital certificate). As another example, a policy may be a prioritization policy that may have conditions to evaluate and actions to execute to determine a priority of a request based on a service level agreement. Other examples of policies include charging, authentication, quality of service, logging, protection of privacy, or any other type of policy to be enforced on communications.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of enforcing policies on communications, comprising:

receiving a communication to a processing device;

analyzing at least one criteria of the received communication to determine one or more policies to be applied to the communication, wherein the at least one criteria includes at least one of the following: a requester of the received communication, a target resource of the received communication, or a responder of the received communication;

prior to passing the target resource the received communication, modifying the received communication based on the one or more policies from the target resource;

using a workflow to enforce the one or more policies on the modified received communication;

executing the workflow using an interface to apply the determined one or more policies to the communication, the workflow including a logical combination of one or more conditions to be satisfied, wherein executing the workflow comprises:

executing a first action to invoke a policy object associated with a first one of the policies to be applied to the communication, the policy object including a second combination of one or more conditions associated with the first policy, wherein the executing of the first action is performed by a first delegated process, and executing a second action to invoke a second policy object associated with a second one of the policies to be applied to the communication, wherein the executing of the second action is performed by a second delegated process, where at least one of the delegated processes is delegated to a private interface, wherein the private interface executes at least one of the actions, and where the action executed by the private interface is not known to the workflow interface, and wherein the first action and the second action are at least partially executed in parallel;

determining that the one or more conditions have been satisfied and that the first and second actions have been executed;

in response to the one or more conditions having been satisfied and the first and second actions having been executed, validating the one or more policies; and based upon the applied one or more policies, processing the received communication.

2. The method of claim 1, further comprising validating the first policy if the policy object executes successfully.

3. The method of claim 1, wherein the policy object is a Business Process Express Language (BPEL) object.

4. The method of claim 1, further comprising if the policy returns an error result, performing error recovery.

5. The method of claim 1, wherein executing the workflow comprises evaluating one or more conditions to determine whether to apply a potential policy to the communication.

6. The method of claim 1, wherein executing a workflow comprises executing a Business Process Express Language (BPEL) workflow.

7. The method of claim 1, wherein receiving the communication comprises intercepting a communication targeted for a resource.

8. The method of claim 7, further comprising if the one or more policies are validated, transmitting the communication to the resource.

9. The method of claim 8, further comprising before transmitting the communication, modifying the communication based on the workflow execution.

10. The method of claim 1, further comprising transmitting a response indicating a result of the policy evaluation.

11. The method of claim 1, wherein the workflow comprises an authorization policy including one or more conditions to evaluate and one or more actions to execute to enforce the authorization policy.

12. The method of claim 1, wherein the workflow comprises a prioritization policy including one or more conditions to evaluate and one or more actions to execute to enforce the prioritization policy.

13. The method of claim 1, wherein the workflow comprises an authentication policy including one or more conditions to evaluation and one or more actions to execute to enforce the authentication policy.

14. The method of claim 1, wherein receiving a communication comprises receiving a Simple Object Access Protocol (SOAP) message.

15. The method of claim 1, wherein the private interface evaluates at least one of any of the one or more of the conditions, and where the condition evaluated by the private interface is not known to the workflow interface.

16. A system of enforcing policies on communications comprising:

a processor;

an interface configured to receive a communication; and memory storing instructions that, when executed by the processor, provide workflow logic for analyzing at least one criteria of the communication received through the interface, wherein the at least one criteria includes at least one of the following: a requester of the received communication, a target resource of the received communication, or a responder of the received communication and determining a logical combination of at least one condition to evaluate, wherein executing the workflow includes executing a first action to invoke a policy object associated with a first one of the policies to be applied to the communication, the policy object including a second combination of one or more conditions associated with the first policy, wherein the executing of the first action is performed by a first delegated process, and executing a second action to invoke a second policy object associated with a second one of the policies to be applied to the communication, wherein the executing of the second action is performed by a second delegated process, where at least one of the delegated processes is delegated to a private interface, wherein the private interface executes at least one of the actions, and where the action executed by the private interface is not known to the workflow interface, and wherein the first action and the second action are at least partially executed in parallel, determine that the one or more conditions have been satisfied and that the first and second actions have been executed, in response to the one or more conditions having been satisfied and the first and second actions having been executed, validate the one or more policies, prior to passing the target resource the received communication, modifying the received communication based on the one or more policies from the target resource and using a workflow to enforce the one or more policies on the modified received communication, the instructions further providing logic that processes the communication based at least in part upon a result of the one or more policies as executed on the communication using an interface.

17. The system of claim 16, wherein the logic comprises a Business Process Execution Language (BPEL) work engine.

18. At least one non-transitory machine-readable medium, having stored thereon sequences of instructions, which, when executed by a machine cause the machine to:

receive a communication; and analyze at least one criteria of the received communication to determine one or more policies to be applied to the communication, wherein the at least one criteria includes at least one of the following: a requester of the received communication, a target resource of the received communication, or a responder of the received communication;

prior to passing the target resource the received communication, modify the received communication based on the one or more policies from the target resource;

use a workflow to enforce the one or more policies on the modified received communication;

execute the workflow using an interface to apply one or more policies to the communication, the workflow including a logical combination of one or more conditions to be satisfied, wherein executing the workflow comprises:

executing a first action to invoke a policy object associated with a first one of the policies to be applied to the communication, the policy object including a second combination of one or more conditions associated with the first policy, wherein the executing of the first action is performed by a first delegated process, and executing a second action to invoke a second policy object associated with a second one of the policies to be applied to the communication, wherein the executing of the second action is performed by a second delegated process, where at least one of the delegated processes is delegated to a private interface, wherein the private interface executes at least one of the actions, and where the action executed by the private interface is not known to the workflow interface, and wherein the first action and the second action are at least partially execute in parallel;

determining that the one or more conditions have been satisfied and that the first and second actions have been executed;

in response to the one or more conditions having been satisfied and the first and second actions having been executed, validating the one or more policies; and based upon the applied one or more policies, process the received communication.

19. A system of enforcing policies on communications, the system comprising:

a processor; and a memory coupled to the processor, wherein the memory includes sets of instructions which when executed by the processor, cause the processor to:

receive a communication to a processing device;

analyze at least one criteria of the received communication to determine one or more policies to be applied to the communication, wherein the at least one criteria includes at least one of the following: a requester of the received communication, a target resource of the received communication, or a responder of the received communication;

prior to passing the target resource of the received communication, modify the received communication based on the one or more policies from the target resource;

use a workflow to enforce the one or more policies on the modified received communication;

execute the workflow using the interface to apply the one or more policies to the communication, the workflow including a logical combination of one or more conditions to be satisfied, wherein executing the workflow comprises:

executing a first action to invoke a policy object associated with a first one of the policies to be applied to the communication, the policy object including a second combination of one or more conditions associated with the first policy, wherein the executing of the first action is performed by a first delegated process, and executing a second action of the one or more actions to invoke a second policy object associated with a second one of the policies to be applied to the communication, wherein the executing of the second action is performed by a second delegated process, where at least one of the delegated processes is delegated to a private interface, wherein the private interface executes at least one of the actions, and where the action executed by the private interface is not known to the workflow interface, and wherein the first action and the second action are at least partially executed in parallel;

determining that the one or more conditions have been satisfied and that the first and second actions have been executed;

in response to the one or more conditions having been satisfied and the first and second actions having been executed, validating the one or more policies; and based upon the applied one or more policies, process the received communication.

* * * * *

UNITED STATES PATENT AND TRADEMARK OFFICE

CERTIFICATE OF CORRECTION

PATENT NO. : 8,032,920 B2
APPLICATION NO. : 11/024160
DATED : October 4, 2011
INVENTOR(S) : Maes It is certified that error appears in the above-identified patent and that said Letters Patent is hereby corrected as shown below:

On Title Page 2, item (56): in column 2, under “Other Publications”, line 19, delete “lintionary” and insert -- linktionary --, therefor.

On Title Page 4, item (56): in column 1, under “Other Publications”, line 3, delete “2/16/200,” and insert -- 2/16/2006, --, therefor.

In column 1, line 6, delete “polices” and insert -- policies --, therefor.

In column 1, line 9, delete “polices.” and insert -- policies. --, therefor.

In column 2, line 40, delete “polices” and insert -- policies --, therefor.

In column 2, line 47, delete “services” and insert -- services. --, therefor.

In column 6, line 10, delete “polices” and insert -- policies --, therefor.

Signed and Sealed this
Twenty-fourth Day of January, 2012

David J. Kappos
*Director of the United States Patent and Trademark Office*